Jan. 16, 1945.   M. K. HEDGE   2,367,214
REEL
Filed Dec. 3, 1940
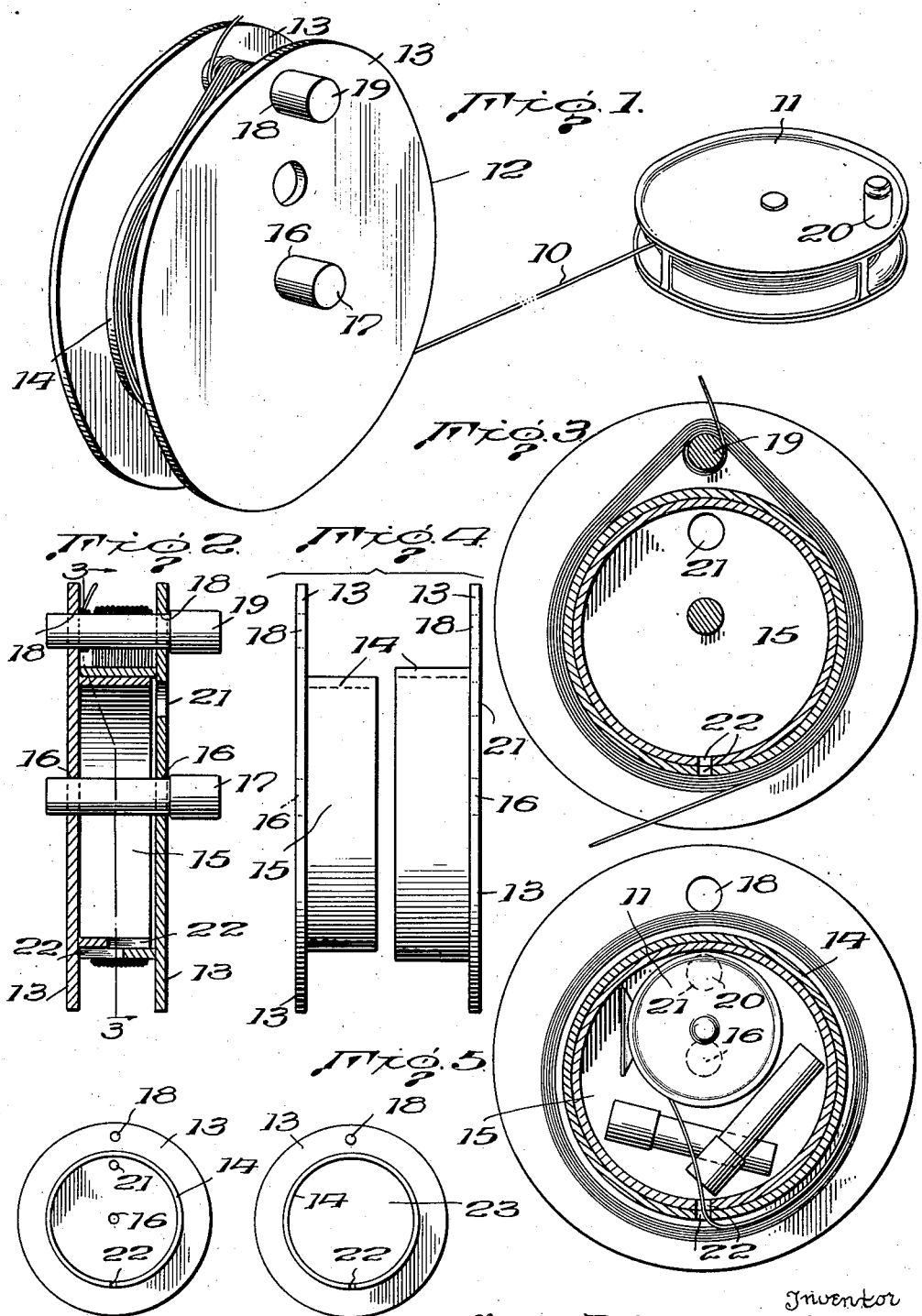

Patented Jan. 16, 1945

2,367,214

UNITED STATES PATENT OFFICE 2,367,214

REEL

Marvin K. Hedge, Norwich, N. Y.

Application December 3, 1940, Serial No. 368,382

5 Claims. (Cl. 242—116)

This invention relates to a combined line drier and line coiler reel.

Among the objects of the invention are the provision of a simple means requiring no clamps or brackets to receive a wet line and dispose the same in loose condition on the reel to dry while the line may still be connected to the conventional fishing-rod reel, and further a storage compartment on the interior of the reel accommodates said rod reel while still connected to said line wound on said drying reel. Simple but effective means are also provided to permit rewinding of the line onto the rod reel from the drying reel.

Other objects of the invention may readily be determined by considering the annexed specification and the drawing forming a part thereof, in which:

Figure 1 is a perspective veiw of my invention in operation;

Figure 2 is a sectional end elevation of part of Figure 1;

Figure 3 is a sectional side elevation taken on line 3—3 of Figure 2;

Figure 4 is an exploded view of my reel;

Figure 5 is a sectional side elevation similar to Figure 3 on the line 3—3 of Figure 2, showing the storage compartment in use;

Figure 6 is a side elevation of a detail of a modification of my invention; and

Figure 7 is a side elevation of another detail of another modification of my invention.

As shown in Figure 1, the invention contemplates receiving a line 10 from a conventional fishing-rod reel 11, particularly when wet, and winding the line onto the drying reel 12, comprising a pair of discs 13, to one side of each of which are secured one of a pair of telescoping cylinders 14, having a smaller diameter than said discs and being mounted slightly decentric with said discs, as clearly shown in Figures 2 through 5. The discs and cylinders may be formed of any suitable material, such as cardboard, "Chipboard," metal, synthetic resins, or the equivalent.

The cylinders 14 are readily separable and the interior of the assembly serves as a storage compartment 15, such as clearly shown in Figure 5.

Discs 13 are each provided with a central aperture 16 through which is freely passed a spindle pin or axle 17, which may have an enlarged head at one end to provide a finger grip and also prevent the pin 17 from passing through the apertures 16, except from one side only.

There are also provided in said discs, additional apertures 18 adjacent the outer peripheries thereof and between said peripheries and the cylinders 14. Preferably, the apertures 18 are placed in the widest part of the flange formed by the discs 13 on cylinders 14. Due to the slight decentricity of the cylinders and discs, the flange is not of a uniform width all around the cylinder. A pin 19 is adapted to be readily inserted in said apertures 18, when aligned, for a two-fold purpose; one, to form a crank with which to revolve the reel, and two, to provide means to enlarge the circumference of the coil of line by winding the same around the cylinder 14 and the pin 19, as shown in Figures 2 and 3.

The pin 19 may afterward be withdrawn whereby the coil of line assumes the position generally shown in Figure 5, that is, it will be spaced from the cylinder 14, whereby air to dry the wet line has ready access to all parts of the coil. If any shrinkage takes place, there is ample space to permit the same, and still have effective drying of the line.

Storage compartment 15 is quite ample to receive a rod reel 11 to store the same, while the line is drying, as well as at other times. The handle 20 of the rod reel 11 is accommodated in an aperture 21 in one disc 13, whereby the reel 11 is held against any appreciable movement, and is thus not in danger of being readily damaged by accidental jarring when in the compartment 15. When so stored while the line 10 is drying, for instance, it is not necessary to disconnect the line from the rod reel.

Each cylinder 14 is provided with an inwardly extending slot 22 which, when the slots are in registry, as shown in Figures 3 and 5, provide an opening through which the line passes from the rod reel in the compartment 15 to the drying coil on the outer cylinder 14.

The pins 17 and 19, as well as numerous other articles, may be stored in compartment 15, when not in use.

From the position shown in Figure 5, the coil may readily be removed in loose condition and tied to hold the same as a loose relatively large coil of line.

Discs 13 are preferably made of a fairly large diameter, that is, about eight inches or so, and the various apertures 16, 18, and 21, additionally serve as finger engaging holes to permit ready manipulation of the separable units of the reel.

When it is desired to rewind the line on the rod reel, the drying reel is mounted on the pin 17, which is held between the knees of the user, whereupon the reel is thus readily pivoted following which the rod reel is operated to wind the line thereon, as the drying reel pays it off.

The modification shown in Figure 6 shows the cylinder 14 absolutely concentric with the disc 13, whereas in the first five figures, the cylinder is not exactly concentric therewith.

In the modification shown in Figure 7, one disc 13 has a large central aperture 23, whereby this part of the reel may be placed on the arm of the user while reeling, if desired. Otherwise, the remaining structure is similar to the other figures.

It will thus be seen that the applicant has provided a simple, efficient and effective device to dry a line in non-tensioned condition, while the air has ready access to all parts of the coil of line. No elaborate stands, trunnions or brackets are necessary to operate the device since it may be readily functioned while held between the users' knees or in his hands with no additional support being necessary.

Having thus described my invention in its preferred embodiments, it is to be understood that the disclosure is for purposes of description only and not to be considered restrictive, the scope of the invention being defined by the following claims.

What I claim is:

1. A combination line drier, coiler, and storage reel comprising a pair of centrally apertured disc-like means, a cylindrical member of less diameter than that of each disc affixed to one face of each disc, said cylinders being of different diameters whereby they may freely telescope with each other, each disc having an aperture therein between its outer periphery and the cylindrical member attached thereto, an element adapted to be inserted through said last named apertures when aligned for support by said disc-like means, and a pin adapted to be inserted through the central apertures of said disc-like means to form an axis on which the reel may rotate, whereby a line may be coiled about said element and outermost cylinder to produce a loose coil on said outermost cylinder when said element is subsequently withdrawn from the apertures in said disc-like members.

2. A line reel and drier comprising a pair of disc means, a cylindrical member of less diameter than each disc fixed to one side of each disc and substantially concentric therewith, the cylindrical members being of different diameters whereby they may telescope and the discs each being provided with an aperture located between the outer periphery thereof and the cylindrical member secured thereto, the interior of the innermost cylinder serving as a storage compartment and one of said discs also having an aperture therein located adjacent the inner surface of the cylinder attached thereto and of sufficient size to receive the winding handle of a conventional fishing rod reel whereby, when said reel is being stored in said compartment, the same will be substantially secured against movement therein, and a pin adapted to be inserted through said first mentioned apertures when aligned for support by said discs, whereby a line may be coiled about said outermost cylindrical member and pin to produce a loose coil on said outermost cylindrical members when said pin is subsequently withdrawn from said apertures which receive the same.

3. A line reel and drier comprising a pair of disc means, a cylindrical member of less diameter than each disc fixed to one side of each disc and substantially concentric therewith, the cylindrical members being of different diameters whereby they may telescope, the interior of the innermost cylinder serving as a storage compartment, each of said discs also having an aperture therethrough located between its outer edge and the cylinder attached thereto, a pin adapted to be inserted through said last apertures when aligned, whereby the line may be passed over said pin when being coiled on the reel so that, upon removal of the pin, a coil of larger periphery than the cylinder is formed to permit access of air to substantially all parts of said coil, each of said cylindrical members having a slot therein extending inwardly from the free edge whereby, when a line is wound on said cylinder, the said slots may be aligned to form a passage through which the line may pass from the coil on the cylinder to a conventional fishing rod reel which may be stored in said compartment so that the line, in drying, need not be disconnected from said reel in said compartment.

4. A line reel and drier comprising a pair of disc means, one of said disc means being apertured, and a cylindrical member of slightly less diameter than each disc fixed to one side of each disc and substantially concentric therewith, the aperture in said one disc means opening into the cylindrical member fixed thereto and both cylindrical members being of different diameters and each also having a slot extending inwardly from the outer edge thereof, whereby said cylinders may be telescoped to form a storage compartment within the innermost cylinder and a line may be wound on said outer cylinder to dry while the inner end of the line may be passed through said aligned slots to the said storage compartment where a conventional fishing-rod reel may be stored while still connected to said line when wound on said cylinder, said aperture in said one disc means being positioned to receive the winding handle of said fishing-rod reel when disposed in said storage compartment to prevent undesirable movement of said fishing-rod reel while stored therein.

5. A line reel comprising in combination, a cylindrical member, flanges on said member at each end extending outward therefrom in substantially parallel relationship to each other, each flange having an aperture therein between its outer edge and the outer surface of said cylindrical member, a bearing in said reel whereby it may be mounted for rotation on a free end of a pintle, and an element provided with a finger engaging portion at one end and adapted to be inserted through said apertures and extend between the flanges for support thereby, said finger engaging portion when in operative position extending outward from the plane of one of said flanges and in the same axial direction as the free end of said pintle to provide manually operable means for rotating said reel to coil a line about said cylindrical member and element and also afford means by which said element may be subsequently withdrawn from said apertures to produce a loose coil of line on said cylindrical member.

MARVIN K. HEDGE.